350-269.

4-9-74 XR 3,803,637 SR

United States Patent [19]

Martin et al.

[11] 3,803,637

[45] Apr. 9, 1974

[54] LASER PRINTER

[75] Inventors: Byron D. Martin, Apalachin; Clarence H. Ristad, Endwell, both of N.Y.

[73] Assignee: International Business Machines Corporation, Armonk, N.Y.

[22] Filed: Nov. 17, 1972

[21] Appl. No.: 307,737

[52] U.S. Cl. .................. 346/76 L, 95/4.5, 346/108, 350/269

[51] Int. Cl. .......................................... G01d 15/14

[58] Field of Search .......... 346/108, 76 L; 95/4.5 R; 178/30; 350/270, 269

[56] References Cited

UNITED STATES PATENTS

| | | | |
|---|---|---|---|
| 2,903,941 | 9/1959 | Bornemann | 346/107 R X |
| 3,020,805 | 2/1962 | Goddard | 350/270 |
| 3,636,837 | 1/1972 | McNaney | 95/4.5 |
| 3,656,175 | 4/1972 | Carlson et al. | 346/76 L |

*Primary Examiner*—Joseph W. Hartary
*Attorney, Agent, or Firm*—Gerald R. Gugger

[57] ABSTRACT

A laser printing system wherein man readable alphanumeric characters and machine readable binary code marks are laser marked on card connector housings. A scanning galvanometer and mirror, lens, and wire mask print heads are provided for rendering the laser beam effective to print in accordance with input data from a punched card reader.

14 Claims, 11 Drawing Figures

LASER PRINTER

BACKGROUND OF THE INVENTION

In the manufacture of circuit card units for use in computers and the like, the cards are mounted in connector housings which are generally made from some plastic material, such as epoxy-glass, glass-phenolic, lucite, etc. It is desirable that identification data be printed along the housing which would indicate, for example, part number, engineering change number, sequence number, job number, and date code. In the past, this information was printed in ink using an ink transfer device having settable type wheels. This type of system did not prove to be satisfactory for several reasons. Setup errors and print errors occurred. The printing was not always clearly legible and there were problems relative to the ink drying. Also, if rework of a housing was required due to errors or a change in the identification data, it was necessary to remove or erase the ink printing and manually change the type wheels if the data had to be changed. This became time consuming particularly where the individual part orders are small in quantity. It became evident that a more automatic and faster operating system was needed and that would give better printing results. In addition, it was desirable to have machine readable capability.

SUMMARY OF THE INVENTION

In the laser printing system of the present invention, there is provided a $CO_2$ laser, a scanning galvanometer having a rotatable mirror, lens, and a pair of programmable wire matrix print heads. The galvanometer scans the laser beam back and forth across the moving card housings with the beam moving perpendicular to the housing motion. The print head wires act as a mask to prevent or allow the beam to strike and burn the housing. The wires are programmed in accordance with input data from a punched card reader and wires are withdrawn whenever printing is desired beneath the wire. Seven wires are used in the one print head to produce a row of the man readable alphanumeric characters which are made up of rectangular bars and a single wire with a tab is used in the other print head to produce another row of a series of lines and spaces representing a binary number which can be machine read.

The housings to be marked are moved past the write station at a uniform velocity of 2.8 inches per second and the laser beam sweeps at a speed of, for example, 400 inches per second resulting in a high speed automatic printing system which can process up to 3,600 one-wide cards per hour, either on or off-line. The life of the print mask is in excess of two million cards before wear becomes a factor and automatic check of the laser can be made by way of inline reading and comparing of binary data. The present system has the advantage of being able to utilize a conveyorized input and output and has high reliability with few moving parts. It also overcomes the aforementioned problems encounted in an ink printing system.

It is, then, a primary object of the present invention to provide a novel laser printing system for marking data on a plastic member.

A further object of the present invention is to provide a novel laser printing system for marking identification data on a circuit card housing.

A still further object of the present invention is to provide a novel laser printing system for printing a row of man readable alphanumeric characters and a row of machine readable binary code marks on a plastic member.

Another object of the present invention is to provide a high speed laser printing system for automatically printing information on a plurality of moving parts.

A further object of the present invention is to provide a high speed laser printing system for automatically printing information on a plurality of moving parts and wherein a first wire print head is provided to produce man readable alphanumeric characters and a second wire print head is provided to produce machine readable binary code marks.

Another object of the present invention is to provide a high speed laser printing system as in the preceding object and wherein said print heads are programmable under control of input data from a punched card reader.

The foregoing and other objects, features and advantages of the invention will be apparent from the following more particular description of a preferred embodiment of the invention as illustrated in the accompanying drawings.

DESCRIPTION OF PREFERRED EMBODIMENT

Figure 1:
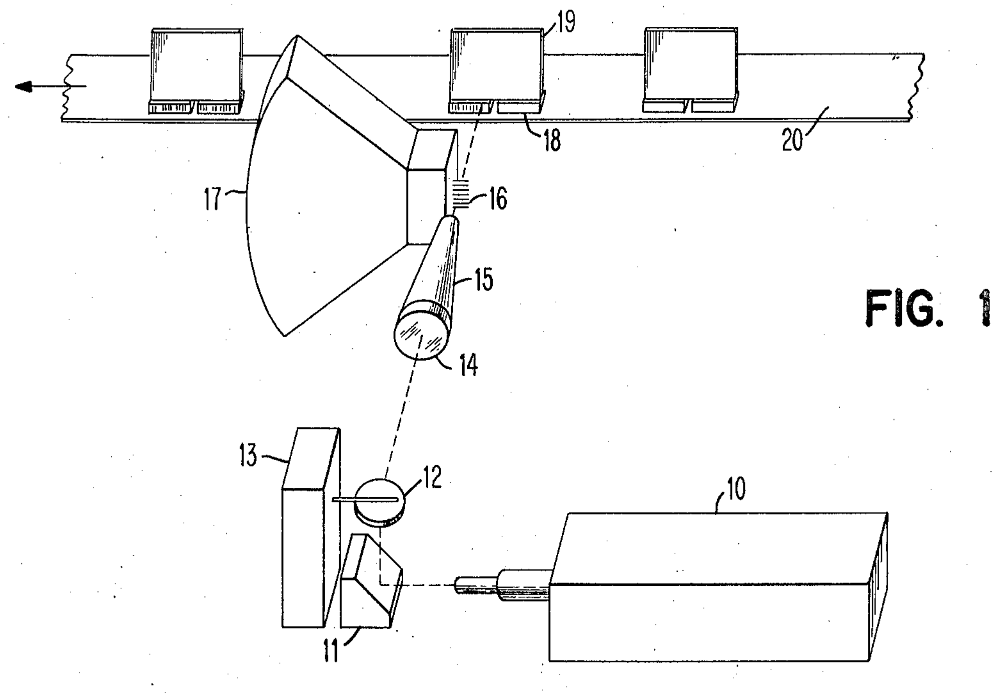
FIG. 1 is a schematic diagram of the laser printing system embodying and illustrating the present invention.

Referring to FIG. 1, there is shown schematically the laser printing system embodying the present invention. The system comprises a 50 watt $CO_2$ laser 10 and a 45° mirror 11 which is positioned to intercept the laser beam and deflect it 90° onto a rotatable mirror 12. The mirror 12 is mounted on the output shaft of a scanning galvanometer 13 which may be of the Series G type marketed by General Scanning Inc., which type will provide the required velocities, angles and frequency for the present printing system. From the mirror 12, the beam is directed through a 2½ inch focal length germanium lens 14 and a cone 15 which is provided with a source of gas flow to protect the lens. Extending adjacent to and across an opening in the end of the cone is a vertical arrangement of eight slidable masking wires 16 which form part of a shutter system 17. The masking wires form the print station and they are in vertical alignment with the phenolic housings 18 of the circuit card assemblies 19 on which information is to be printed. The card assemblies are moved past the print station at a uniform velocity of 2.8 inches per second by any suitable conveyor means 20.

Figure 2:
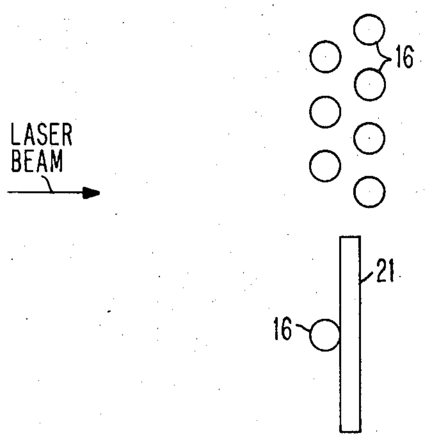
FIG. 2 is an enlarged view showing the arrangement of the masking wires used to print the alphanumeric characters and binary code marks.

The wires 16 act as a mask to prevent or allow the laser beam to strike the housings 18. They are normally extended to prevent printing and are withdrawn whenever printing is desired in a wire position. Looking at the ends of the wires, as shown in FIG. 2, the upper seven wires are arranged in one print head in staggered fashion and are used to print the man readable alphanumeric characters. The other print head contains the eighth wire which has fastened at its end a tab member 21 which is used to print the machine readable vertical lines. With all eight wires in their normal extended position, it can be seen that the seven staggered wires and tab 21 on the eight wire will block the laser beam and no printing will take place. In the present embodiment, these wires have a diameter of 0.015 inch and are on 0.015 inch staggered centers.

Figure 9:
FIG. 9 illustrates the machine readable binary code pattern produced by the present system.
Figure 3:
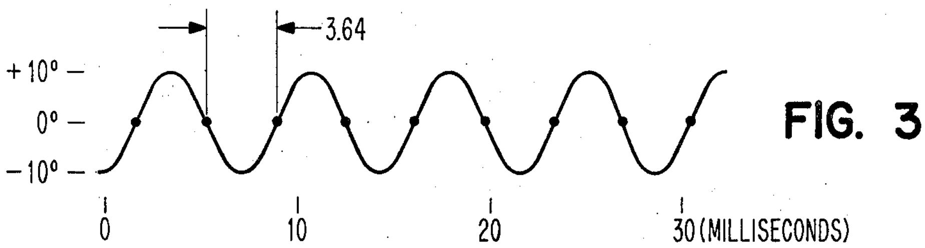
FIG. 3 is a plot diagram illustrating the angular position of the mirror versus time.
Figure 6:
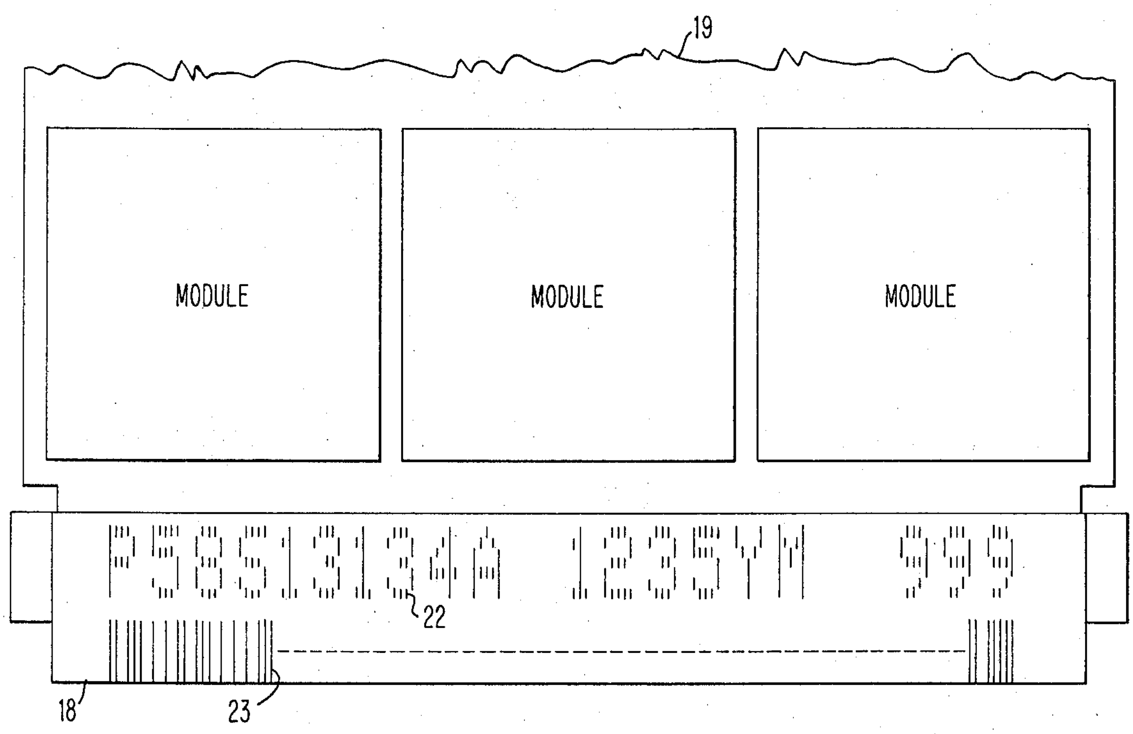
FIG. 6 is a view of a typical circuit card and housing and showing the format of the alphanumeric and binary code printing.
Figure 7:
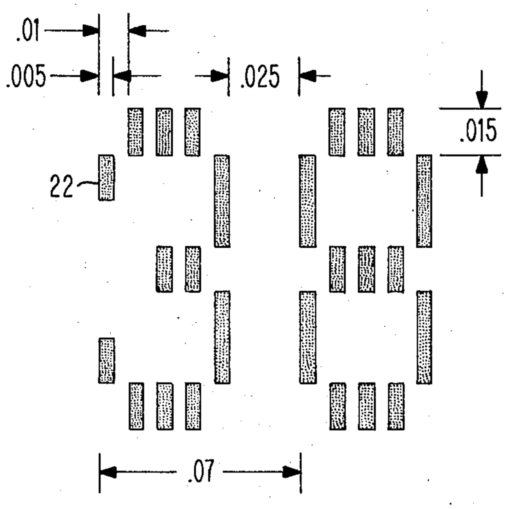
FIG. 7 is an enlarged view illustrating the 7 × 5 matrix of rectangular bars used to form the alphanumeric characters.

Referring to FIG. 7, a 7 × 5 matrix is used for the characters. The laser beam sweeps vertically back and forth across the card housings at a speed of 400 inches/second and as the seven upper wires are selectively retracted, the rectangular bars 22 are burned or printed on the housings to form the desired character. The bars are approximately 0.015″ × 0.005″ and are horizontally spaced on 0.010 inch centers. Each 0.1 inch vertical line in a character requires only 250 microseconds to mark and there are approximately 3.6 milliseconds between vertical lines so that the angle between lines is less than 2°. As shown in FIG. 6, a row of alphanumeric characters is printed across the upper half of the card housing 18. Across the bottom half of the housing there is printed the machine readable information which consists of 80 laser burned bars 23. As the card housing moves past the print station at the uniform velocity of 2.8 inches per second, every 3.6 milliseconds the laser beam, moving perpendicular to the card motion and at a speed of 400 inches per second, will burn a bar 0.005 inch wide by 0.1 inch high and tilted by 0.4°. The first two bars will be on 0.010 inch centers and the next 78 bars will be on 0.010 or 0.020 inch centers as required to represent binary data by delta distance code A (retrospective pulse modulation) wherein a change represents a 0 and no change represents a 1. Referring to FIG. 3, there is shown a plot for the angular position of the rotatable scanning mirror 12 versus time. Referring to the binary code pattern shown in FIG. 9, the close spaced bars are printed by retracting the tab member 21 during each pass of the beam. A wide space is caused by leaving the tab extended during one pass of the beam.

Figure 4:
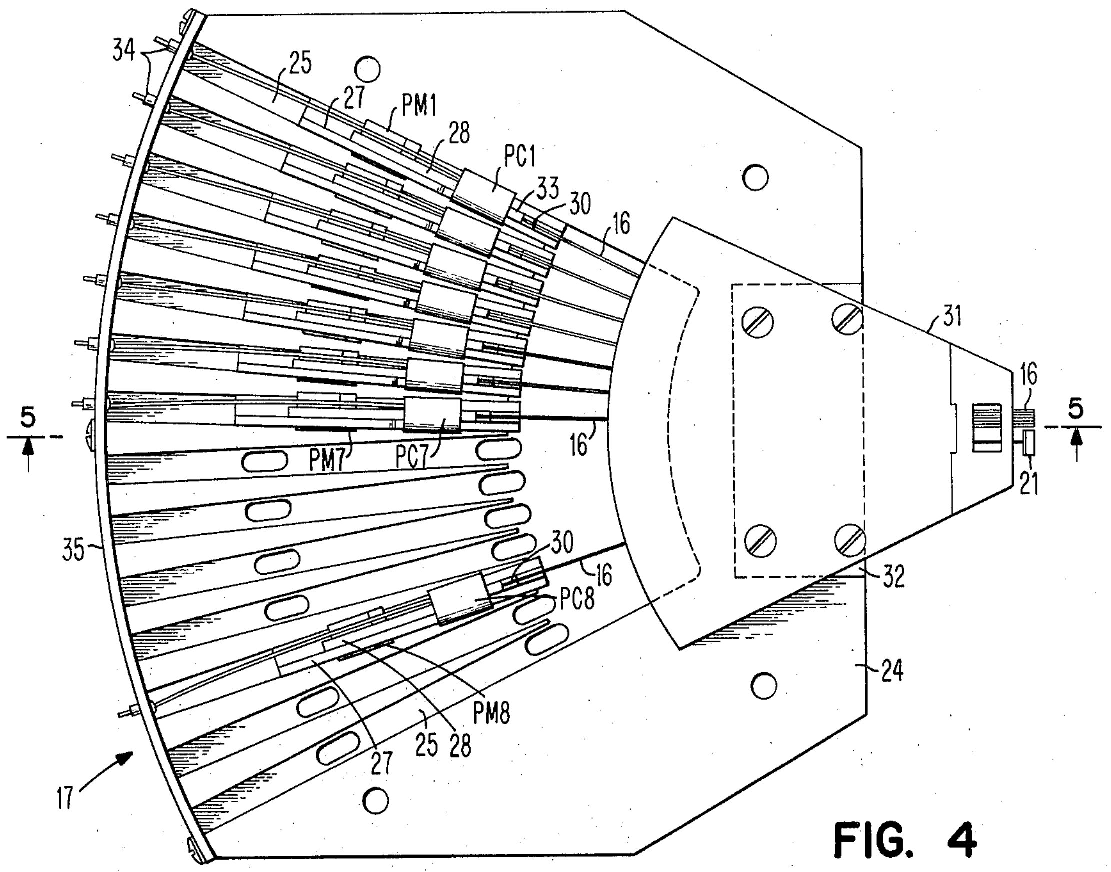
FIG. 4 is a side elevation view showing the assembly of the masking wires in the print heads.
Figure 5:
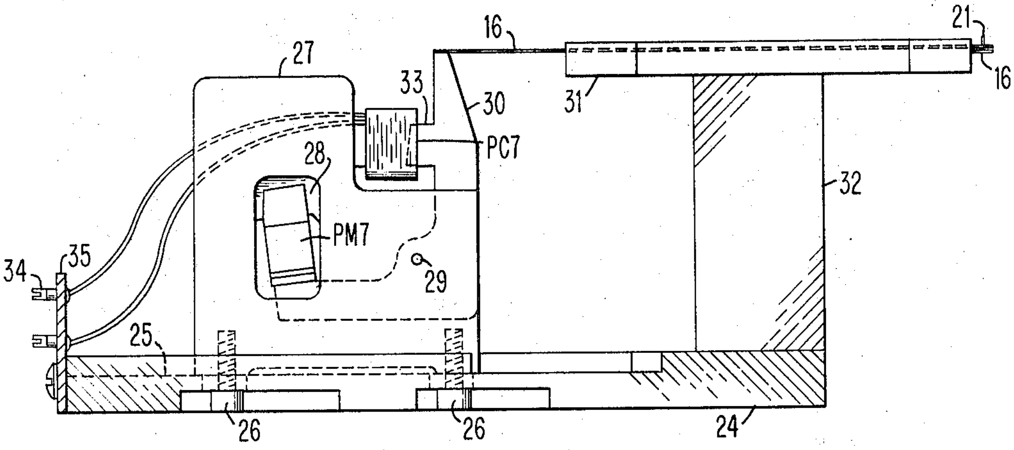
FIG. 5 is a view taken generally along line 5—5 of the assembly in FIG. 4 and showing the drive mechanism for a wire.

Referring now to FIGS. 4 and 5, there is shown the assembly of the shutter system 17 and the mechanism for driving the wires 16. The assembly comprises a base plate 24 having cut therein a series of 14 channels 25. As viewed in FIG. 4, the upper 7 channels define the upper print head which is used for the alphanumeric characters and the lower 7 channels define the lower print head which is used for the machine readable bars. In each of the 7 channels in the upper print head there is mounted, by way of screws 26, a support plate 27 and in similar fashion there is one support plate 27 mounted in the lower print head. Attached to each support plate 27 is a mounting plate 28 and these mounting plates carry the permanent magnets PMI–PM8 and the print coils PC1-PC8. Also, each support plate 27 has pivotally mounted thereon, by means of a pin 29, a bell crank lever 30 and each lever has attached to the end of its upper arm one of the masking wires 16. The eight masking wires 16 are slideably mounted in a wire guide block 31 fastened on a support block 32. In the normal position when the wires are extended to block the laser beam, each lever 30 has its lower arm attracted against its associated permanent magnet. To retract a wire to effect a printing operation, each lever 30 has a protruding portion 33 on its upper arm which extends into the hollow center of its associated print coil. The print coils PC1–PC8 are wired to associated terminals 34 on a terminal strip 35 and when a selected print coil is pulsed, the coil will pivot its associated lever counterclockwise to retract its masking wire 16. At the completion of the pulse, the lever and wire will be restored to their normal position by their associated permanent magnet.

Figure 8:
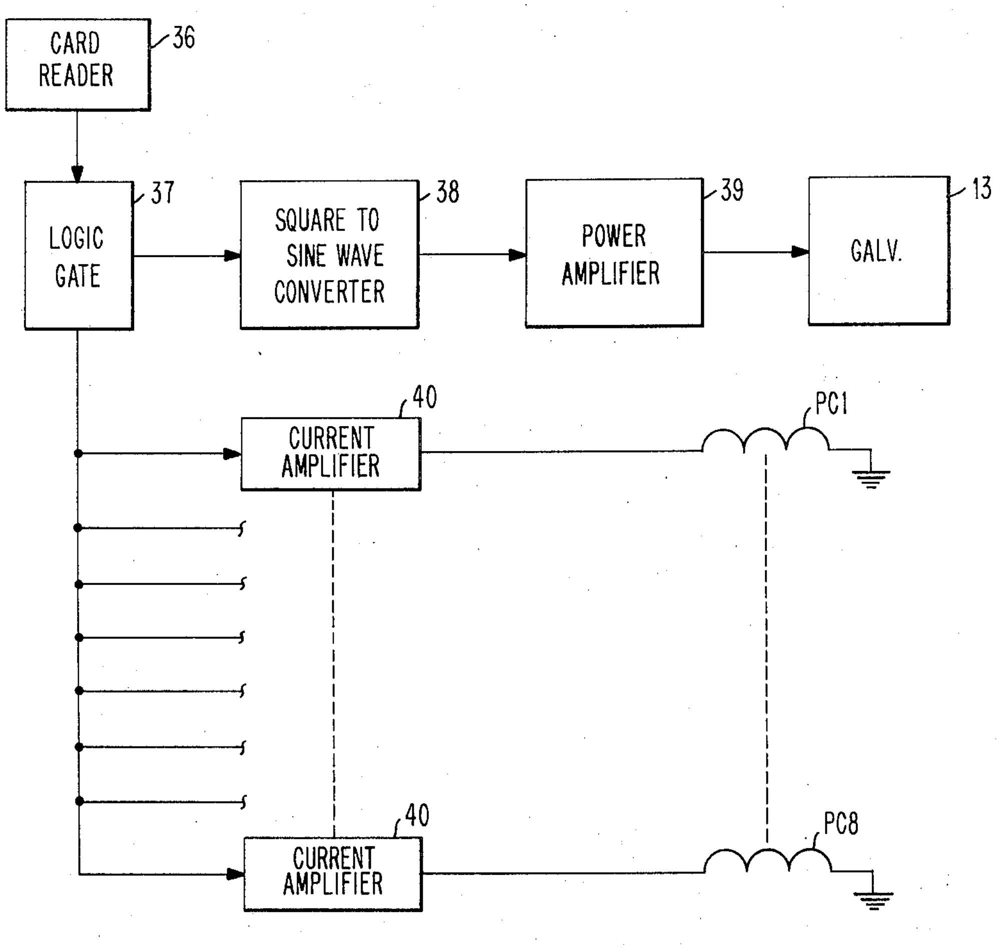
FIG. 8 is a block wiring diagram for the laser printing system of FIG. 1.

The circuitry for controlling the printing system is shown schematically in FIG. 8. Input data information is taken from a card reader 36, or any suitable input source, and fed to a logic gate 37. An output from the logic gate is fed through a square to sine wave converter 38 and a power amplifier 39 to the galvanometer 13. The galvanometer rotates the scanning mirror 12 up and down every 137.5 cycles per second. Also, eight outputs are taken from the logic gate and fed through current amplifiers 40 to the print coils PC1–PC8 to control the printing of the man readable characters and the machine readable bars.

Figure 10:
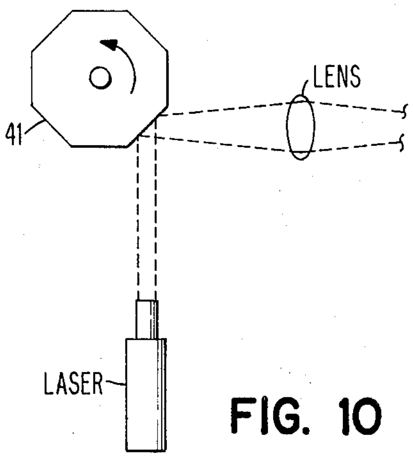
FIG. 10 illustrates an alternate method for producing the scan.
Figure 11:
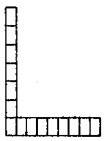
FIG. 11 illustrates the pattern produced when the velocity of the part is reduced.

Other wire arrangements than the one shown in FIG. 2 could be used. For example, a single row of 15 mil wires on 15 mil centers could be used or a single row of 10 mil wires on 15 mil centers. However, it was found that the staggered arrangement shown in FIG. 2 produced the most readable characters. As shown in FIG. 10, a rotating mirror 41 could be used instead of a galvonometer to produce the scan. Referring to FIG. 11, there is shown the pattern that would be formed if the velocity of the part is reduced to one inch per second. The parallel vertical lines burned will be overlapping whereby solid lines could be burned horizontally as well as vertically.

The present system wherein characters are formed by a combination of a swept beam, a moving part, and a high speed programmable wire matrix results in a very high speed printing system, for example, 40 characters per second, and one wherein good resolution is obtained. Also, the use of the present wire matrix technique together with the movable tab wire uniquely permits both machine and man readable data to be imprinted simultaneously on a single part in one pass of the part.

While the invention has been particularly shown and described with reference to a preferred embodiment thereof, it will be understood by those skilled in the art that various changes in form and details may be made therein without departing from the spirit and scope of the invention.

What is claimed is:

1. A laser printing system for recording man readable alphanumeric characters and machine readable code marks on a moving part in accordance with input data which comprises;

means for producing a laser beam;

means for sweeping said beam back and forth across said moving part with the beam moving perpendicular to the motion of the part;

a shutter system including a group of movable masking wires and a separate single movable masking wire normally positioned to block said beam from striking the moving part; and means responsive to the input data for selectively moving said group of wires to allow said beam to strike the part to record a row of said alphanumeric characters and for selectively moving said single wire to allow said beam to strike the part to record a row of said code marks.

2. A laser printing system for recording man readable alphanumeric characters and machine readable code marks on a moving part in accordance with input data which comprises;

means for producing a laser beam;

means for sweeping said beam back and forth across said moving part with the beam moving perpendicular to the motion of the part;

a shutter system including a first print head having a group of movable masking wires and a second print head moving a single movable wire with a masking tab thereon; said group of wires and said single wire and tab being normally positioned to block said beam from striking the moving part; and means responsive to the input data for selectively moving said group of wires to allow said beam to strike the part to record said alphanumeric characters and for selectively moving said single wire and tab to allow the beam to strike the part to record said code marks.

3. A laser printing system as in claim 2 wherein said print heads are arranged to print said characters in a row extending across the part and said code marks in a row extending across the part and parallel to said character row.

4. A laser printing system as in claim 2 wherein said group of wires is arranged to produce characters which are made up of marks arranged in a matrix pattern.

5. A laser printing system as in claim 2 wherein said machine readable code marks are variably spaced apart to represent binary data.

6. A laser printing system for recording man readable alphanumeric characters and machine readable code marks on a series of horizontally moving parts in accordance with input data which comprises;

means for producing a laser beam;

a scanning galvanometer and mirror for sweeping said beam vertically back and forth across said moving parts;

a shutter system including a first print head having a group of horizontally reciprocable vertically arranged masking wires and a second print head having a single horizontally reciprocable wire with a masking tab thereon; said group of wires and said single wire and tab being normally positioned to block said beam from striking the moving parts; and circuit means responsive to the input data for selectively reciprocating said group of wires to allow said beam to strike the parts to record said alphanumeric characters and for selectively reciprocating said single wire and tab to allow the beam to strike the parts to record said code marks.

7. A laser printing system as in claim 6 wherein said single wire and tab is in vertical alignment with said group of wires for recording said characters and code marks in parallel rows across said parts.

8. A laser printing system as in claim 6 wherein said group of wires comprises seven wires for producing characters which are made up of a plurality of rectangular bars arranged in a 7 × 5 matrix.

9. A laser printing system as in claim 6 wherein said masking tab extends vertically to produce a series of vertical lines which are variably spaced apart to represent binary data.

10. A laser printing system for recording man readable alphanumeric characters and machine readable code marks on a series of horizontally moving parts in accordance with input data which comprises;

means for producing a laser beam;

means for sweeping said beam vertically back and forth across said moving parts;

a shutter system including a first print head having a group of horizontally reciprocable vertically arranged masking wires and a second print head having a single horizontally reciprocable wire with a masking tab thereon; said single wire and tab being in vertical alignment with said group of wires;

a plurality of pivotal members, there being one member attached to each of said wires;

a plurality of permanent magnets with each magnet normally in contact with an associated one of said members to place said group of masking wires and said single wire and masking tab in an extended position to block the beam from striking said moving parts;

a plurality of print coils with each coil positioned for actuating an associated one of said members to retract the wire attached thereto from its extended position; and means for pulsing said print coils in accordance with said input data whereby said group of wires are selectively retracted to allow the beam to strike the parts and record said alphanumeric characters and said single wire and tab is selectively retracted to allow the beam to strike the parts and record said code marks.

11. A laser printing system as in claim 10 wherein each permanent magnet is effective to actuate its associated member and move the wire attached thereto to its extended blocking position upon termination of a pulse to the print coil associated with the same member.

12. A laser printing system as in claim 10 wherein said group of masking wires comprises seven wires arranged vertically in staggered relationship.

13. A laser printing system for recording man readable alphanumberic characters and machine readable code marks on a series of horizontally moving parts in accordance with input data which comprises;

means for producing a laser beam;

a rotating mirror for sweeping said beam vertically back and forth across said moving parts;

a shutter system including a first print head having a group of horizontally reciprocable vertically arranged masking wires and a second print head having a single horizontally reciprocable wire with a masking tab thereon; said group of wires and said single wire and tab being normally positioned to block said beam from striking the moving parts; and circuit means responsive to the input data for selectively reciprocating said group of wires to allow said beam to strike the parts to record said alphanumeric characters and for selectively reciprocating said single wire and tab to allow the beam to strike the parts to record said code marks.

14. A laser printing system as in claim 2 wherein said group of wires comprises seven wires arranged to produce characters which are made up of marks arranged in a 7 × 5 matrix.

* * * * *